US010609599B2

(12) United States Patent
Lehmann et al.

(10) Patent No.: US 10,609,599 B2
(45) Date of Patent: Mar. 31, 2020

(54) APPARATUSES, METHODS, AND COMPUTER PROGRAMS FOR ALLOCATING TRANSMISSION RESOURCES AND FOR A MOBILE TRANSCEIVER

(71) Applicant: VOLKSWAGEN AG, Wolfsburg (DE)

(72) Inventors: Bernd Lehmann, Wolfsburg (DE);
Thorsten Hehn, Wolfsburg (DE); Jose Pablo Villacis Cobos, Wolfsburg (DE)

(73) Assignee: Volkswagen AG (DE)

( * ) Notice: Subject to any disclaimer, the term of this patent is extended or adjusted under 35 U.S.C. 154(b) by 5 days.

(21) Appl. No.: 15/877,455

(22) Filed: Jan. 23, 2018

(65) Prior Publication Data
US 2018/0227802 A1    Aug. 9, 2018

(30) Foreign Application Priority Data

Feb. 7, 2017 (EP) .................................. 17154947

(51) Int. Cl.
*H04L 1/00* (2006.01)
*H04W 28/16* (2009.01)
(Continued)

(52) U.S. Cl.
CPC .............. *H04W 28/16* (2013.01); *H04L 1/00* (2013.01); *H04L 1/004* (2013.01); *H04L 1/0009* (2013.01);
(Continued)

(58) Field of Classification Search
CPC . H04W 28/16; H04W 72/12; H04W 72/0406; H04W 28/04; H04W 72/042;
(Continued)

(56) References Cited

U.S. PATENT DOCUMENTS

2016/0044619 A1* 2/2016 Ryu ..................... H04W 76/14
370/350
2016/0294512 A1 10/2016 Noh et al.
(Continued)

FOREIGN PATENT DOCUMENTS

JP    2010524014 A    7/2010
JP    2012120161 A    6/2012
(Continued)

OTHER PUBLICATIONS

Potevio; Details of V2V resource pool design; 3GPP TSG-RAN WG1#85 R1-165066; May 13, 2016; pp. 1-3.
(Continued)

*Primary Examiner* — Mohamed A Kamara
(74) *Attorney, Agent, or Firm* — Barnes & Thornburg LLP

(57) ABSTRACT

Apparatuses, methods and computer programs for allocating transmission resources and for a mobile transceiver. An apparatus for a mobile transceiver of a mobile communication system includes a transceiver module to receive control information from a base station transceiver of the mobile communication system and to communicate with another mobile transceiver of the mobile communication system. The apparatus also includes a control module to control the transceiver module. The control module receives information related to a first resource pool and information related to a second resource pool using the transceiver module. The control module also communicates with the other mobile transceiver using the transceiver module using a rateless code to encode data for transmission on resources of the second resource pool.

32 Claims, 3 Drawing Sheets

(51) Int. Cl.
*H04W 72/04* (2009.01)
*H04W 28/04* (2009.01)
*H04W 72/12* (2009.01)

(52) U.S. Cl.
CPC ......... *H04W 28/04* (2013.01); *H04W 72/042* (2013.01); *H04W 72/0406* (2013.01); *H04W 72/12* (2013.01); *H04W 72/0453* (2013.01)

(58) Field of Classification Search
CPC .. H04W 72/0453; H04L 1/004; H04L 1/0009; H04L 1/00
See application file for complete search history.

(56) References Cited

U.S. PATENT DOCUMENTS

| | | | |
|---|---|---|---|
| 2017/0079026 A1* | 3/2017 | Li | H04W 72/04 |
| 2017/0310427 A1* | 10/2017 | Wakabayashi | H04L 1/1825 |
| 2019/0029020 A1* | 1/2019 | Zhao | H04W 72/04 |
| 2019/0075547 A1* | 3/2019 | Chae | H04W 4/40 |

FOREIGN PATENT DOCUMENTS

| | | |
|---|---|---|
| JP | 2015511429 A | 4/2015 |
| JP | 2016529786 A | 9/2016 |
| WO | 2015000144 A1 | 1/2015 |
| WO | 2016017099 A1 | 2/2016 |
| WO | 2016155647 A1 | 10/2016 |
| WO | 2016159712 A1 | 10/2016 |
| WO | 2017008227 A1 | 1/2017 |

OTHER PUBLICATIONS

Samsung; Priority handling for UE autonomous resource selection; 3GPP TSG-RAN WG1#85 R1-164761; May 13, 2016; pp. 1-5.
Office Action for Japanese Patent Application No. 2018-019385; dated Dec. 3, 2018.
Huawei; Uu-based V2V transport Based on Location Information; 3GPP TSG-RAN WG2#93bis R2-162292; Apr. 2, 2016; pp. 1-5.

* cited by examiner

APPARATUSES, METHODS, AND COMPUTER PROGRAMS FOR ALLOCATING TRANSMISSION RESOURCES AND FOR A MOBILE TRANSCEIVER

PRIORITY CLAIM

This patent application claims priority to European Patent Application No. 17154947.0, filed 7 Feb. 2017, the disclosure of which is incorporated herein by reference in its entirety.

SUMMARY

Illustrative embodiments relate to apparatuses, methods and computer programs for allocating transmission resources, and for a mobile transceiver, more particularly, but not exclusively, to a concept for resource management in a mobile communication system for vehicular communication.

BRIEF DESCRIPTION OF THE DRAWINGS

The disclosed embodiments will be described with reference to the accompanying figures, in which.

DETAILED DESCRIPTION

Figure 1:
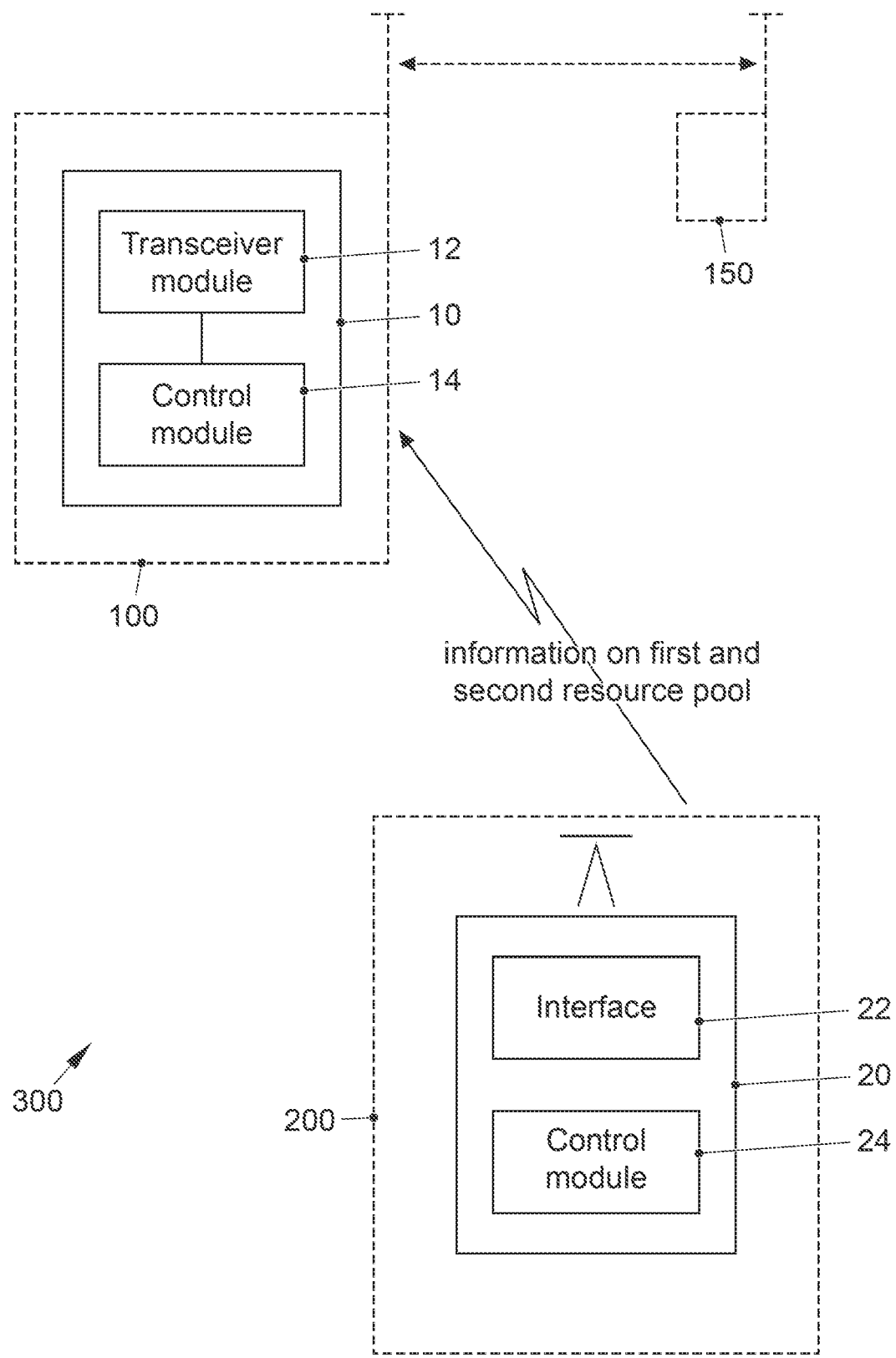
FIG. 1 illustrates an embodiment of an apparatus for a mobile transceiver and an embodiment of an apparatus for allocating resources.

Direct communication between portable devices and vehicles is a feature of some mobile communication systems. Future cars may include communications systems which allow for direct data transmission between the vehicles. One very prominent example is direct transmission according to the IEEE (Institute of Electrical and Electronics Engineers) 802.11p standard (and the corresponding upper layer standards). A common use for such a vehicular connectivity standard is to broadcast information to neighboring vehicles. This can be status information, which would be transmitted regularly or event-driven messages such as emergency information.

An alternative to IEEE 802.11p is under standardization by the industry consortium 3GPP (Third Generation Partnership Project). This consortium develops cellular communications technology and proposes a direct communication standard for vehicles, called C-V2X (Cellular Vehicle to Everything). This concept has efficient methods for transmitting status information in a regular pattern.

Document WO 2016/017099 A1 discloses a concept using multiple resource pools for device-to-device communication in a mobile communication system. Different resource pools can then be used depending on whether a device is in-coverage or out-of-coverage of a base station transceiver. Document US 2016/0294512 A1 describes a concept for decoding a channel code and using parity bits for different block sizes.

There is a demand for an improved concept for direct communication in a mobile communication system. The independent claims provide an improved concept for direct communication.

Disclosed embodiments are based on the finding that there are different natures of messages communicated between mobile transceivers, e.g., mobile phones or vehicles. One type of message is, for example, a status message, which is reported periodically. Another type of message is an event-driven message, for example, an emergency or warning message. It is a further finding that event-driven messages may be broadcast with an intention to enable their reception by as many receivers as possible, e.g., in a direct proximity of a vehicle. Based on this finding a rateless code can be used to encode a message. Rateless codes may enable to receive a message although erasures (reception gaps, packet losses, bit errors, block errors, bursty errors, etc.) occur, e.g., due to interference, disadvantageous radio channel conditions or discontinuous reception. These codes allow for different receivers to recover the transmitted message, independent of the amount of packets lost, while causing only small coding overhead. If discontinuous reception stems from the receiver's own transmission activity, this scheme can serve users with different activity schemes simultaneously.

Disclosed embodiments provide an apparatus for a mobile transceiver of a mobile communication system. The apparatus comprises a transceiver module configured to receive control information from a base station transceiver of the mobile communication system and to communicate with another mobile transceiver of the mobile communication system. The apparatus further comprises a control module configured to control the transceiver module and to receive information related to a first resource pool and information related to a second resource pool using the transceiver module. The control module is further configured to communicate with the other mobile transceiver using the transceiver module and using a rateless code to encode data for transmission on resources of the second resource pool. Disclosed embodiments may enable direct communication between mobile transceivers using multiple resource pools, the resources of one of which are used for rateless encoded data.

Disclosed embodiments also provide an apparatus for allocating transmission resources to a mobile transceiver of a mobile communication system for direct communication with another mobile transceiver. The apparatus comprises an interface configured to communicate with the mobile transceiver and a control module configured to control the interface. The control module is further configured to determine a first resource pool and a second resource pool, wherein the second resource pool comprises resources for transmissions using a rateless code to encode data. The control module is further configured to provide information related to the first and second resource pools to the mobile transceiver using the interface. Disclosed embodiments enable a configuration of a mobile transceiver of a mobile communication system with two resource pools. Having different resource pools enables enhanced radio resource management, as resource utilization can be adapted to the nature or the type of the information to be communicated.

In further disclosed embodiments the control module may be configured to receive data from the other mobile transceiver using resources from the first and/or the second resource pool. In disclosed embodiments resources from the first and/or the second resource pool may be used for direct device-to-device data transmission and/or reception. Therewith the two resource pools enable indirect control for the network being enabled to determine which kind of information is communicated on which one of the resource pools. In some disclosed embodiments the control module may be configured to transmit and/or receive periodic data using the first resource pool and to transmit and/or receive event-driven data using the second resource pool. Disclosed embodiments may provide separate resource pools for communication of periodic data, e.g., status information, and for communication of event-driven data, e.g., emergency or warning messages. An improved resource management and higher efficiency may be achieved using separate resource pools for different message types.

Some disclosed embodiments may consider that the control module is configured to transmit data and receive data at different time resources. For example, the control module or a transceiver unit of the mobile transceiver may be implemented in a way that simultaneous transmission and reception is not possible, hence when transmitting on resources of the first resource pool, reception on other resources, e.g., the ones of the second resource pool, is not possible. This limitation is commonly known as the "half-duplex problem". Consequently, data receptions are missed out on the resources of the second resource pool during transmission. The rateless encoding, however, enables an efficient scheme to combat the packet loss or the interrupted reception.

The control module may be configured to apply the rateless coding to application layer data packets. An application executed at a mobile transceiver may then be able to overcome packet loss due to discontinuous reception or other phenomena. The rateless code may be a forward error correction code, an erasure correcting code, a network code, a Fountain code, or a Raptor code, for example. The control module may be configured to use resources of the second resource pool for broadcast transmissions using the transceiver module. Broadcast direct device-to-device messages may be application layer encoded using the rateless code. Therewith receiving mobile transceivers may be able to efficiently receive broadcast messages although some data packet losses may occur. For example, the second resource pool comprises an interrupted pattern of time resources. A bandwidth of resources of the first resource pool may be wider than a bandwidth of the resources of the second resource pool. Time interruptions during which no resources for transmission are available may be longer in the first resource pool than in the second resource pool.

In some disclosed embodiments at least one of the mobile transceivers may be comprised by a vehicle. Disclosed embodiments also provide a vehicle comprising the above described apparatus.

Disclosed embodiments also provide a method for a mobile transceiver of a mobile communication system. The method comprises receiving information related to a first resource pool and information related to a second resource pool. The method further comprises communicating with the other mobile transceiver using a rateless code to encode data for transmission on resources of the second resource pool.

Disclosed embodiments further provide a method for allocating transmission resources to a mobile transceiver of a mobile communication system for direct communication with another mobile transceiver. The method comprises determining a first resource pool and a second resource pool, wherein the second resource pool comprises resources for transmissions using a rateless code to encode data. The method further comprises providing information related to the first and second resource pools to the mobile transceiver.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a similar way.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the Figures optional features are shown using broken lines. FIG. 1 illustrates an embodiment of an apparatus 10 for a mobile transceiver 100 of a mobile communication system 300. The apparatus 10 comprises a transceiver module 12 configured to receive control information from a base station transceiver 200 of the mobile communication system 300 and to communicate with another mobile transceiver 150 of the mobile communication system 300. The mobile transceiver apparatus 10 further comprises a control module 14 configured to control the transceiver module 12. The control module 14 is further configured to receive information related to a first resource pool and information related to a second resource pool using the transceiver module 12. The control module is further configured to communicate with the other mobile transceiver 150 using the transceiver module 12 using a rateless code to encode data for transmission on resources of the second resource pool. Disclosed embodiments also provide a mobile transceiver 100 comprising an embodiment of the apparatus 10. Disclosed embodiments also provide a vehicle, e.g., a car, a bus, a train, a bike or motorbike, a boat or ship, an airplane, etc., comprising an embodiment of the mobile transceiver 100. The control module 14 is coupled to the transceiver module 12. At least one of the mobile transceivers 100, 150 may be comprised by a vehicle.

As further shown in FIG. 1, embodiments also provide an apparatus 20 for allocating transmission resources to a mobile transceiver 100 of a mobile communication system 300 for direct communication with another mobile transceiver 150. Disclosed embodiments also provide a network component, e.g., a base station transceiver 200, a network controller, a network node, etc., comprising an embodiment of the apparatus 20. The apparatus 20 comprises an interface 22 configured to communicate with the mobile transceiver 100. The apparatus 20 further comprises a control module 24 configured to control the interface 22. The control module 24 is further configured to determine a first resource pool and a second resource pool. The second resource pool comprises resources for transmissions using a rateless code to encode data. The apparatus 20 is further configured to provide information related to the first and second resource pools to the mobile transceiver 100 using the interface 22. The control module 24 is coupled to the interface 22.

The mobile communication system 300 may, for example, correspond to one of the Third Generation Partnership Project (3GPP)-standardized mobile communication networks, where the term mobile communication system 300 is used synonymously to mobile communication network. The mobile or wireless communication system 300 may correspond to a mobile communication system of the 5th Generation (5G) and may use mm-Wave technology. The mobile communication system 300 may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver 200 can be operable or configured to communicate with one or more active mobile transceivers 100 and a base station transceiver 200 can be located in or adjacent to a coverage area of another base station transceiver, e.g., a macro cell base station transceiver or small cell base station transceiver. Hence, disclosed embodiments may provide a mobile communication system 300 comprising one or more mobile transceivers 100, 150 and one or more base station transceivers 200, wherein the base station transceivers 200 may establish macro cells or small cells, as, e.g., pico-, metro-, or femto cells. A mobile transceiver 100 may correspond to a smartphone, a cell phone, user equipment, a laptop, a notebook, a personal computer, a Personal Digital Assistant (PDA), a Universal Serial Bus (USB)-stick, a car, a vehicle etc. A mobile transceiver 100 may also be referred to as User Equipment (UE) or mobile in line with the 3GPP terminology.

A base station transceiver 200 can be located in the fixed or stationary part of the network or system. A base station transceiver 200 may correspond to a remote radio head, a transmission point, an access point, a macro cell, a small cell, a micro cell, a femto cell, a metro cell etc. A base station transceiver 200 can be a wireless interface of a wired network, which enables transmission of radio signals to a UE or mobile transceiver 100. Such a radio signal may comply with radio signals as, for example, standardized by 3GPP or, generally, in line with one or more of the above listed systems. Thus, a base station transceiver 200 may correspond to a NodeB, an eNodeB, a Base Transceiver Station (BTS), an access point, a remote radio head, a relay station, a transmission point etc., which may be further subdivided in a remote unit and a central unit.

A mobile transceiver 100 can be associated with a base station transceiver 200 or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In other words, in disclosed embodiments the mobile communication system may correspond to a HetNet, which utilizes different cell types, i.e., Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some disclosed embodiments a small cell's coverage area can at least partly be surrounded by the coverage area of a macro cell established by another base station transceiver. The small cells can be deployed to extend the capacity of the network. A metro cell may therefore be used to cover a smaller area than a macro cell, e.g., a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e., its coverage area may have a diameter below 50 m. Thus, a base station transceiver may also be referred to as cell.

Moreover, mobile transceivers 100,150 may communicate directly with each other, i.e., without involving any base station transceiver 200, which is also referred to as Device-to-Device (D2D) communication. An example of D2D is direct communication between vehicles, also referred to as Vehicle-to-Vehicle communication (V2V). To do so radio resources are used, e.g., frequency, time, code, and/or spatial resources, which may as well be used for wireless communication with a base station transceiver. The assignment of the radio resources will be described in the sequel, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, subcarriers, one or more radio frames, radio sub-frames, radio slots, one or more code sequences potentially with a respective spreading factor, one or more spatial resources, such as spatial sub-channels, spatial precoding vectors, any combination thereof, etc.

In disclosed embodiments a control module, e.g., the control modules 14 and/or 24, may be implemented using one or more processing units, one or more processing devices, any mode for processing, such as a processor, a computer or a programmable hardware component being operable with accordingly adapted software. In other words, the described function of the control module 14, 24 may as well be implemented in software, which is then executed on one or more programmable hardware components. Such hardware components may comprise a general purpose processor, a Digital Signal Processor (DSP), a micro-controller, etc.

In disclosed embodiments the transceiver module 12 may comprise typical transceiver components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The antennas may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field, a field array, combinations thereof, etc.

In disclosed embodiments the interface 22 of the apparatus 20 for allocating radio resources may be a connector, a pin, a plug, a register, etc. that is configured to provide and/or to determine signals from other network components. In some disclosed embodiments the interface 22 may be configured to provide and/or determine analog or digital signals, signals of a transmission band, an intermediate band, or in the base band. Between the interface 22 and the other components there may be intermediate links, wired or wireless connections, interfaces, etc. The interface 22, in some disclosed embodiments one or more interfaces 22, is configured or adapted such that corresponding information or signaling can be exchanged between the apparatus 20 and the respective other network components, e.g., the transceiver module 12 in case the apparatus 20 is implemented in a base station transceiver 200. In such an embodiment the interface 22 may correspond to a transceiver module 12, i.e., it may be implemented in line with the transceiver module 12 according to the above description.

In disclosed embodiments the control module 14 of the apparatus 10 can be configured to receive data from the other mobile transceiver 150 using resources from the first and/or the second resource pool. Hence, there can be a data exchange, transmission and reception, between the two mobile transceivers 100, 150 using the resource of the second resource pool.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In the following focus will be on mode 4 as this mode is considered of higher interest for the automotive industry, but disclosed embodiments may as well be applied to mode 3 (distributed scheduling in which the information on the resource pools may be indirectly provided by the network, e.g., by setting mode 3). Reasons include independence from mobile network operators and operational costs.

Mode 4 assumes that channel access by each vehicle or UE will be given by Semi-Persistent Scheduling with sensing (SPS with sensing). Each vehicle or UE may use a recurring pattern to place its information into time-frequency resource grid. In time instants, e.g., all time instants, in which the vehicle is not transmitting, it may sense for transmissions by others. Once resource reselection happens, the vehicle or UE may pick the resource on which a low or even the lowest energy has been sensed. While this concept lends itself to efficient transmission of regular status data, it might not be amenable to transmitting event-driven data, which may be enabled with disclosed embodiments. For example, the control module 14 is configured to transmit and/or receive periodic data using the first resource pool and to transmit and/or receive event-driven data using the second resource pool.

If one needs to transmit data outside of the current pattern, this may interfere with other users' patterns. Partitioning the resource pool in the frequency domain may solve this problem, but it may lead to inefficiencies due to the half-duplex constraint. The control module 14 may be configured to transmit data and receive data at different time resources. As at least some transceivers, e.g., in some vehicles, cannot listen while they actively transmit (half-duplex), the usage of one resource pool may prevent simultaneous use of the other resource pool. This may effectively divide the capacity of the system.

Forward Error Correction (FEC) may be used to correct transmission errors. Erasure correcting codes are specifically used to correct erasures in the transmission. Rateless codes are used in broadcast scenarios where the number of erasures significantly varies between different receivers. Prominent examples are the class of Fountain codes, including Raptor codes. In disclosed embodiments the rateless code is a forward error correction code, an erasure correcting code, a network code, or a Fountain code. The rateless code may use erasure correcting codes and the second resource pool to provide independent channel access and to overcome the inefficiencies of the half-duplex constraint (i.e., a mobile transceiver not being able to transmit and receive at the same time). The term rateless may be understood in a way that the code rate can be configured, i.e., after a limited number of transmissions, broadcasting of ratelessly encoded packets is stopped, hence the code rate is not zero, but can be adapted to the circumstances or communication scenario.

In a disclosed embodiment Fountain Codes are used to protect the information in the second resource pool against erasures. These erasures occur when a vehicle or UE, which is supposed to hear the information in the second resource pool, is transmitting on the first resource pool. The fountain will be kept active such that surrounding vehicles, despite their own transmission activities, can successfully decode the information from the second resource pool. Furthermore, the Fountain or rateless code also takes care of the message retransmissions that are usually sent out for an emergency message. The additional redundancy that comes from a retransmission is provided by keeping the fountain active a little longer.

Figure 2:
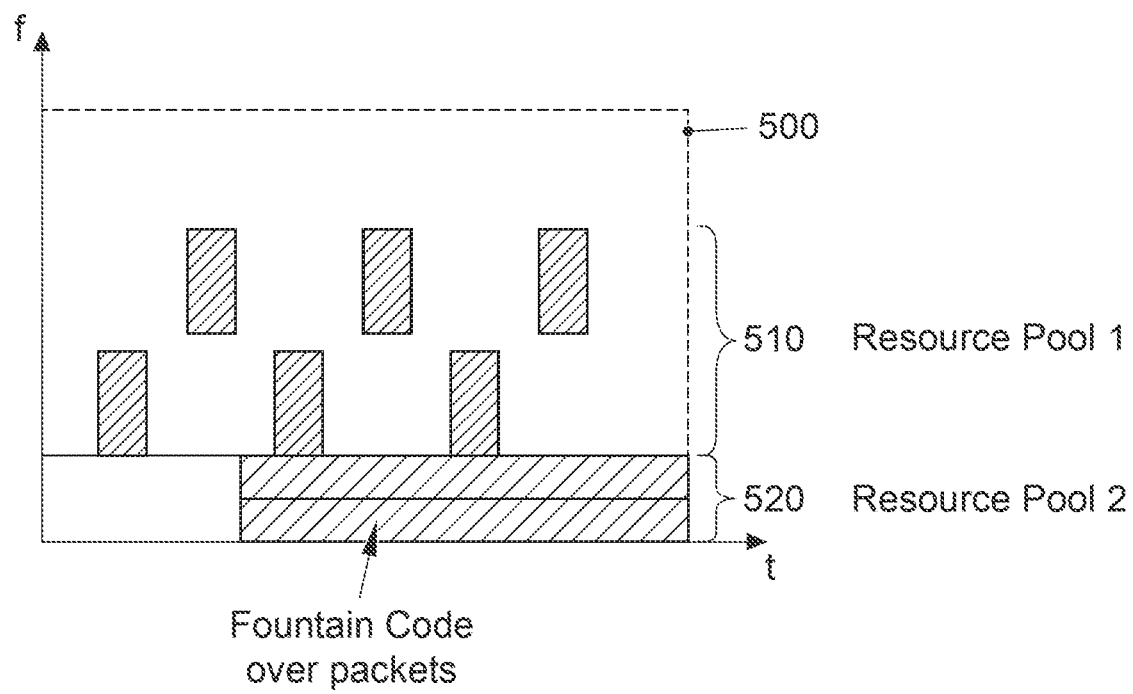
FIG. 2 illustrates first and second resource pools in a disclosed embodiment.

FIG. 2 illustrates first and second resource pools in a disclosed embodiment. FIG. 2 shows a time-frequency grid (time on the abscissa and frequency on the ordinate). In this disclosed embodiment the overall system resources are determined by time-frequency resource blocks (RBs) and the overall resource set (system bandwidth and time pattern) is indicated by the box 500 in FIG. 2. The overall resource set 500 can be subdivided by a grid of frequency and time resources, e.g., in an LTE system a grid of subsets of subcarriers and time resource such as 12 subcarriers (180 kHz in LTE) and two time slots (one subframe, i.e., 1 ms in LTE). Resources of the first resource pool are indicated by 510 and resources of the second resource block are indicated by 520 in FIG. 2. A Fountain code is used to encode data packets transmitted on the resources of the second resource pool 520. In this disclosed embodiment the control module 14 is configured to apply the rateless/Fountain coding to application layer data packets. The assignment of the respective lower layer packets to the accordingly configured radio bearers/radio access bearer is also carried out by the control module 14, likewise by a control module implemented at the receiving mobile transceiver.

For example, the control module 14 may be configured to use resources of the second resource pool for broadcast transmissions (via the transceiver module 12). As FIG. 2 further indicates the second resource pool 520 comprises an interrupted pattern of time resources. In some disclosed embodiments a bandwidth of resources of the first resource pool 510 is wider than a bandwidth of the resources of the second resource pool 520 as indicated by the height of the bars in FIG. 2. Furthermore, in some disclosed embodiments time interruptions, during which no resources for transmission are available, are longer in the first resource pool 510 than in the second resource pool 520 as also indicated by FIG. 2.

Disclosed embodiments may accommodate multiple transmissions in the second resource pool. To this end, the transmission of the Fountain encoded data on resources of the second resource pool may include a gap pattern such that other messages and users can mingle into the stream. The Fountain code approach may use common knowledge at a sender/transmitter and all receivers of a generator matrix. In a vehicular setup, this can be achieved using a pseudo-random generator, e.g., based on Global Navigation Satellite System (GNSS) time. A time stamped derived from the GNSS time would then be used to generate a seed input into a pseudo-random generator. The Fountain encoding can be applied on the application layer. This means that every resource block in the second resource pool 520 may be decoded separately. The erasure correction code may experience erasures coming in bursts, but this does not impair its decoding capabilities.

Figure 3:
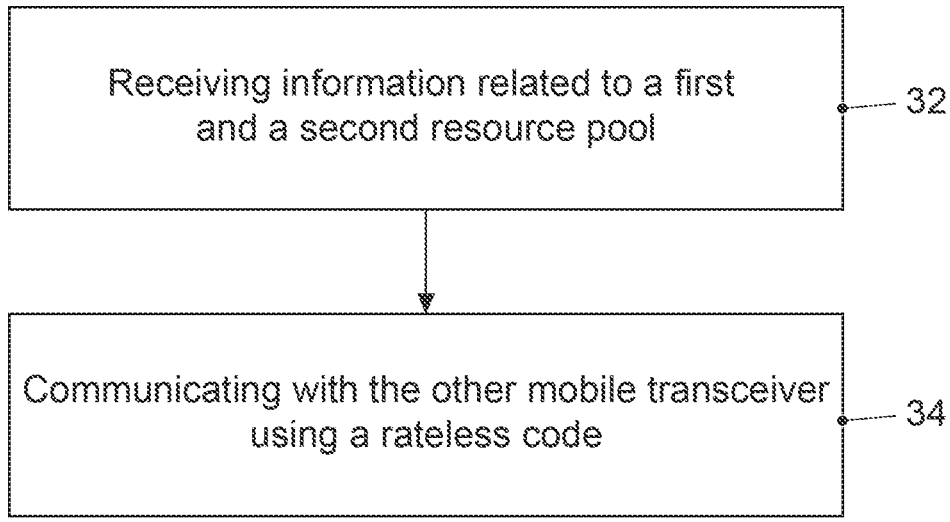
FIG. 3 shows a block diagram of a flow chart of a disclosed embodiment of a method for a mobile transceiver.

FIG. 3 shows a block diagram of a flow chart of a disclosed embodiment of a method for a mobile transceiver 100 of a mobile communication system 300. The method comprises receiving 32 information related to a first resource pool and information related to a second resource pool. The method further comprises communicating 34 with the other mobile transceiver 150 using a rateless code to encode data for transmission on resources of the second resource pool.

Figure 4:
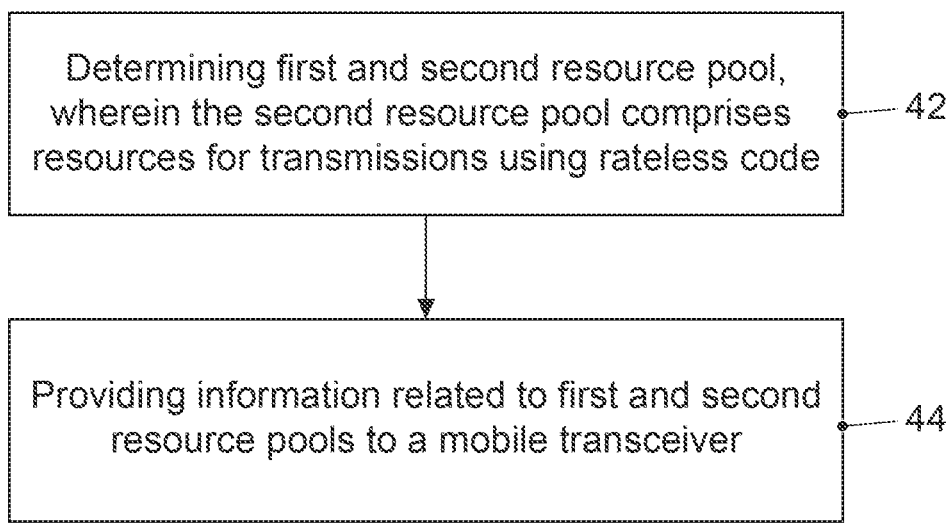
FIG. 4 shows a block diagram of a flow chart of a disclosed embodiment of a method for allocating transmission resources.

FIG. 4 shows a block diagram of a flow chart of a disclosed embodiment of a method for allocating transmission resources to a mobile transceiver 100 of a mobile communication system 300 for direct communication with another mobile transceiver 150. The method comprises determining 42 a first resource pool and a second resource pool. The second resource pool comprises resources for transmissions using a rateless code to encode data. The method further comprises providing 44 information related to the first and second resource pools to the mobile transceiver 100.

Another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles, variations, and embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having a way for performing each of the respective operations of these methods.

LIST OF REFERENCE SIGNS

10 mobile transceiver apparatus
12 transceiver module
14 control module
20 apparatus for allocating resource
22 interface
24 control module
32 receiving information related to a first and a second resource pool
34 communicating with the other mobile transceiver using a rateless code
42 determining first and second resource pool, wherein the second resource pool comprises resources for transmissions using rateless code
44 providing information related to first and second resource pools to a mobile transceiver
100 mobile transceiver
150 other mobile transceiver
200 base station transceiver
300 mobile communication system
500 system set of resources
510 first resource pool
520 second resource pool

The invention claimed is:

1. An apparatus for a mobile transceiver of a half-duplex mobile communication system, the apparatus comprising:
a transceiver module configured to receive control information from a base station transceiver of the half-duplex mobile communication system and to communicate with another mobile transceiver of the half-duplex mobile communication system; and
a control module configured to:
control the transceiver module,
receive information related to a first resource pool and information related to a second resource pool using the transceiver module, and
communicate with the other mobile transceiver using the transceiver module using a rateless code to encode data for transmission on resources of the second resource pool,
wherein the control module is configured to use resources of the second resource pool for broadcast transmissions using the transceiver module, and wherein the rateless code is a Fountain code, encoded data with the Fountain code transmitted on resources of the second resource pool including a gap pattern, and the control module being configured to apply encoding with the Fountain code to application layer data packets.

2. The apparatus of claim 1, wherein the control module receives data from the other mobile transceiver using resources from the first and/or the second resource pool.

3. The apparatus of claim 1, wherein the control module transmits and/or receives periodic data using the first resource pool and transmits and/or receives event-driven data using the second resource pool.

4. The apparatus of claim 1, wherein the control module transmits data and receives data at different time resources.

5. The apparatus of claim 1, wherein the control module applies the rateless coding to application layer data packets.

6. The apparatus of claim 1, wherein the control module uses resources of the second resource pool for broadcast transmissions using the transceiver module.

7. The apparatus of claim 1, wherein the second resource pool comprises an interrupted pattern of time resources.

8. A vehicle comprising an apparatus for a mobile transceiver of a half-duplex mobile communication system, the apparatus comprising:
a transceiver module configured to receive control information from a base station transceiver of the half-duplex mobile communication system and to communicate with another mobile transceiver of the half-duplex mobile communication system; and
a control module configured to:
control the transceiver module,
receive information related to a first resource pool and information related to a second resource pool using the transceiver module, and
communicate with the other mobile transceiver using the transceiver module using a rateless code to encode data for transmission on resources of the second resource pool,
wherein the control module is configured to use resources of the second resource pool for broadcast transmissions using the transceiver module, and wherein the rateless code is a Fountain code, encoded data with the Fountain code transmitted on resources of the second resource pool including a gap pattern, and the control module being configured to apply encoding with the Fountain code to application layer data packets.

9. The vehicle of claim 8, wherein the control module receives data from the other mobile transceiver using resources from the first and/or the second resource pool.

10. The vehicle of claim 8, wherein the control module transmits and/or receives periodic data using the first resource pool and transmits and/or receives event-driven data using the second resource pool.

11. The vehicle of claim 8, wherein the control module transmits data and receives data at different time resources.

12. The vehicle of claim 8, wherein the control module applies the rateless coding to application layer data packets.

13. The vehicle of claim 8, wherein the control module uses resources of the second resource pool for broadcast transmissions using the transceiver module.

14. The vehicle of claim 8, wherein the second resource pool comprises an interrupted pattern of time resources.

15. An apparatus for allocating transmission resources to a mobile transceiver of a half-duplex mobile communication system for direct communication with another mobile transceiver, the apparatus comprising:
an interface to communicate with the mobile transceiver of the half-duplex mobile communication system; and
a control module to:
control the interface,
determine a first resource pool and a second resource pool, wherein the second resource pool comprises resources for transmissions using a rateless code to encode data, and
provide information related to the first and second resource pools to the mobile transceiver using the interface,
wherein the control module is configured to use resources of the second resource pool for broadcast transmissions using the mobile transceiver, and wherein the rateless code is a Fountain code, encoded data with the Fountain code transmitted on resources of the second resource pool including a gap pattern, and the control module being configured to apply encoding with the Fountain code to application layer data packets.

16. The apparatus of claim 15, wherein a bandwidth of resources of the first resource pool is wider than a bandwidth of the resources of the second resource pool, and/or wherein time interruptions, during which no resources for transmission are available, are longer in the first resource pool than in the second resource pool.

17. The apparatus of claim 15, wherein at least one of the mobile transceivers is comprised by a vehicle.

18. A method for a mobile transceiver of a half-duplex mobile communication system, the method comprising:
receiving information related to a first resource pool and information related to a second resource pool; and
communicating with another mobile transceiver of the half-duplex mobile communication system using a rateless code to encode data for transmission on resources of the second resource pool,
wherein the resources of the second resource pool are used for broadcast transmissions using the mobile transceiver, and wherein the rateless code is a Fountain code, encoded data with the Fountain code transmitted on resources of the second resource pool including a gap pattern, and encoding with the Fountain code being applied to application layer data packets.

19. A method for allocating transmission resources to a mobile transceiver of a half-duplex mobile communication system for direct communication with another mobile transceiver, the method comprising:
determining a first resource pool and a second resource pool, wherein the second resource pool comprises resources for transmissions using a rateless code to encode data; and
providing information related to the first and second resource pools to the mobile transceiver of the half-duplex mobile communication system,
wherein the resources of the second resource pool are used for broadcast transmissions using the mobile transceiver, and wherein the rateless code is a Fountain code, encoded data with the Fountain code transmitted on resources of the second resource pool including a gap pattern, and encoding with the Fountain code being applied to application layer data packets.

20. A non-transitory computer readable medium having a program code for performing a method for a mobile transceiver of a half-duplex mobile communication system when the computer program is executed on a computer, a processor, or a programmable hardware component, the method comprising:
receiving information related to a first resource pool and information related to a second resource pool; and
communicating with another mobile transceiver of the half-duplex mobile communication system using a rateless code to encode data for transmission on resources of the second resource pool,
wherein resources of the second resource pool are used for broadcast transmissions using the mobile transceiver, and wherein the rateless code is a Fountain code, encoded data with the Fountain code transmitted on resources of the second resource pool including a gap pattern, and encoding with the Fountain code being applied to application layer data packets.

21. The apparatus of claim 1, wherein the rateless code uses forward error correction to correct transmission errors and uses erasure correction to correct erasures in transmission as well as the second resource pool to provide independent channel access and to correct for packet loss due to discontinuous reception resulting from mobile transceiver half-duplex operation, and
wherein an associated code rate can be configured such that the code rate is adaptable.

22. The apparatus of claim 8, wherein the rateless code uses forward error correction to correct transmission errors and uses erasure correction to correct erasures in transmission as well as the second resource pool to provide independent channel access and to correct for packet loss due to discontinuous reception resulting from mobile transceiver half-duplex operation, and
wherein an associated code rate can be configured such that the code rate is adaptable.

23. The apparatus of claim 15, wherein the rateless code uses forward error correction to correct transmission errors and uses erasure correction to correct erasures in transmission as well as the second resource pool to provide independent channel access and to correct for packet loss due to discontinuous reception resulting from mobile transceiver half-duplex operation, and
wherein an associated code rate can be configured such that the code rate is adaptable.

24. The method of claim 18, wherein the rateless code uses forward error correction to correct transmission errors and uses erasure correction to correct erasures in transmission as well as the second resource pool to provide independent channel access and to correct for packet loss due to discontinuous reception resulting from mobile transceiver half-duplex operation, and
wherein an associated code rate can be configured such that the code rate is adaptable.

25. The method of claim 19, wherein the rateless code uses forward error correction to correct transmission errors and uses erasure correction to correct erasures in transmission as well as the second resource pool to provide independent channel access and to correct for packet loss due to discontinuous reception resulting from mobile transceiver half-duplex operation, and wherein an associated code rate can be configured such that the code rate is adaptable.

26. The non-transitory computer readable medium of claim 20, wherein the rateless code uses forward error correction to correct transmission errors and uses erasure correction to correct erasures in transmission as well as the second resource pool to provide independent channel access and to correct for packet loss due to discontinuous reception resulting from mobile transceiver half-duplex operation, and wherein an associated code rate can be configured such that the code rate is adaptable.

27. The apparatus of claim 1, wherein the Fountain code includes a Raptor code.

28. The apparatus of claim 8, wherein the Fountain code includes a Raptor code.

29. The apparatus of claim 15, wherein the Fountain code includes a Raptor code.

30. The method of claim 18, wherein the Fountain code includes a Raptor code.

31. The method of claim 19, wherein the Fountain code includes a Raptor code.

32. The non-transitory computer readable medium of claim 20, wherein the Fountain code includes a Raptor code.

* * * * *